United States Patent
Mills et al.

(10) Patent No.: US 10,279,302 B2
(45) Date of Patent: *May 7, 2019

(54) FILTER ELEMENTS; AIR FILTER ARRANGEMENTS; AND, METHODS

(71) Applicant: Donaldson Company, Inc., Minneapolis, MN (US)

(72) Inventors: Jarren B. Mills, Apple Valley, MN (US); Daniel Adamek, Bloomington, MN (US); Richard Dejong, Eden Prairie, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 59 days.

This patent is subject to a terminal disclaimer.

(21) Appl. No.: 15/477,235

(22) Filed: Apr. 3, 2017

(65) Prior Publication Data

US 2017/0203246 A1     Jul. 20, 2017

Related U.S. Application Data

(63) Continuation of application No. 14/297,738, filed on Jun. 6, 2014, now Pat. No. 9,610,529, which is a continuation of application No. 13/412,076, filed on Mar. 5, 2012, now Pat. No. 8,747,512, which is a continuation of application No. 12/386,482, filed on
(Continued)

(51) Int. Cl.
| | |
|---|---|
| *B01D 46/00* | (2006.01) |
| *B01D 46/52* | (2006.01) |
| *B01D 46/10* | (2006.01) |
| *B01D 39/16* | (2006.01) |

(52) U.S. Cl.
CPC ....... *B01D 46/521* (2013.01); *B01D 39/1607* (2013.01); *B01D 46/002* (2013.01); *B01D 46/0005* (2013.01); *B01D 46/0036* (2013.01); *B01D 46/10* (2013.01);
(Continued)

(58) Field of Classification Search
CPC ........ B01D 29/11; B01D 29/07; B01D 46/52; B01D 46/002; B01D 49/13; B01D 29/15
USPC ................. 55/482, 486, 498, 502, 521, 529; 210/323.1, 346, 486, 484
See application file for complete search history.

(56) References Cited

U.S. PATENT DOCUMENTS

| | | | |
|---|---|---|---|
| 4,242,115 A | 12/1980 | Harold et al. | |
| 4,410,427 A | 10/1983 | Wydeven | |

(Continued)

FOREIGN PATENT DOCUMENTS

| | | |
|---|---|---|
| DE | 199 35 297 | 2/2001 |
| DE | 10 2004 005 904 A1 | 9/2005 |

(Continued)

OTHER PUBLICATIONS

Declaration of Inventor Randall Engelland dated Aug. 22, 2013.
(Continued)

*Primary Examiner* — Duane Smith
*Assistant Examiner* — Minh Chau T Pham
(74) *Attorney, Agent, or Firm* — Merchant & Gould P.C.

(57) ABSTRACT

Filter elements are described. In an example embodiment, the filter element has a support framework and media defining a closed end and an open end. A non-circular radial seal is depicted, in an example. Variations for particular applications are described.

20 Claims, 5 Drawing Sheets

Related U.S. Application Data

Apr. 16, 2009, now Pat. No. 8,128,724, which is a continuation of application No. 11/275,904, filed on Feb. 2, 2006, now Pat. No. 7,520,913.

(60) Provisional application No. 60/733,978, filed on Nov. 3, 2005, provisional application No. 60/650,019, filed on Feb. 4, 2005.

(52) U.S. Cl.
CPC .... *B01D 2271/02* (2013.01); *B01D 2271/027* (2013.01); *B01D 2275/10* (2013.01); *B01D 2275/206* (2013.01)

(56) References Cited

U.S. PATENT DOCUMENTS

| | | |
|---|---|---|
| 4,589,983 A | 5/1986 | Wydevan |
| 4,613,438 A | 9/1986 | DeGraffenreid |
| 4,715,954 A | 12/1987 | DeGraffenreid |
| 4,720,292 A | 1/1988 | Engel et al. |
| 4,746,340 A | 5/1988 | Durre et al. |
| D326,706 S | 6/1992 | Karlsson |
| 5,167,683 A | 12/1992 | Behrendt et al. |
| 5,401,285 A | 3/1995 | Gillingham et al. |
| 5,487,767 A | 1/1996 | Brown |
| 5,575,826 A | 11/1996 | Gillingham et al. |
| 5,613,992 A | 3/1997 | Engel |
| 5,683,479 A | 11/1997 | Gillingham et al. |
| 5,730,769 A | 3/1998 | Dungs et al. |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| D399,944 S | 10/1998 | Gillingham et al. |
| 5,820,646 A | 10/1998 | Gillingham et al. |
| 5,893,937 A | 4/1999 | Moessinger |
| 5,895,574 A | 4/1999 | Friedmann et al. |
| 5,902,364 A | 5/1999 | Tokar et al. |
| D417,268 S | 11/1999 | Gillingham et al. |
| 6,039,778 A | 3/2000 | Coulonvaux et al. |
| D425,189 S | 5/2000 | Gillingham et al. |
| D428,128 S | 7/2000 | Gillingham et al. |
| 6,179,890 B1 | 1/2001 | Ramos et al. |
| D437,401 S | 2/2001 | Ramos et al. |
| D437,402 S | 2/2001 | Gieseke et al. |
| 6,190,432 B1 | 2/2001 | Gieseke et al. |
| 6,210,469 B1 | 4/2001 | Tokar et al. |
| 6,221,122 B1 | 4/2001 | Gieseke et al. |
| 6,235,195 B1 | 5/2001 | Tokar |
| D444,219 S | 6/2001 | Gieseke et al. |
| D447,549 S | 9/2001 | Gieseke et al. |
| D450,827 S | 11/2001 | Gieseke et al. |
| D450,828 S | 11/2001 | Tokar |
| 6,348,084 B1 | 2/2002 | Gieseke et al. |
| 6,348,085 B1 | 2/2002 | Tokar et al. |
| 6,350,291 B1 | 2/2002 | Gieseke et al. |
| 6,350,296 B1 | 2/2002 | Warner |
| 6,368,374 B1 | 4/2002 | Tokar et al. |
| 6,387,162 B1 | 5/2002 | Kosmider et al. |
| D460,169 S | 7/2002 | Anderson et al. |
| D461,003 S | 7/2002 | Gieseke et al. |
| 6,416,605 B1 | 7/2002 | Golden |
| D464,129 S | 10/2002 | Xu et al. |
| 6,482,247 B2 | 11/2002 | Jaroszczyk et al. |
| 6,517,598 B2 | 2/2003 | Anderson et al. |
| D471,623 S | 3/2003 | Gieseke et al. |
| D473,637 S | 4/2003 | Golden |
| 6,572,667 B1 | 6/2003 | Greif et al. |
| D477,659 S | 7/2003 | Gieseke et al. |
| 6,599,342 B2 | 7/2003 | Andress et al. |
| 6,610,126 B2 | 8/2003 | Xu et al. |
| D481,101 S | 10/2003 | Boehrs et al. |
| 6,638,332 B1 | 10/2003 | Schmitz et al. |
| 6,652,614 B2 | 11/2003 | Gieseke et al. |
| D483,459 S | 12/2003 | DeWit et al. |
| D484,584 S | 12/2003 | Anderson et al. |
| 6,673,136 B2 | 1/2004 | Gillingham et al. |
| 6,706,087 B1 | 3/2004 | Gebler et al. |
| 6,743,317 B2 | 6/2004 | Wydeven |
| 6,746,518 B2 | 6/2004 | Gieseke et al. |
| D497,202 S | 10/2004 | Carter et al. |
| 6,852,141 B2 | 2/2005 | Bishop et al. |
| 6,872,237 B2 | 3/2005 | Gillingham et al. |
| 6,878,190 B1 | 4/2005 | Xu et al. |
| D506,539 S | 6/2005 | Bishop et al. |
| 6,908,494 B2 | 6/2005 | Gillingham et al. |
| 6,936,084 B2 | 8/2005 | Schlensker et al. |
| 6,966,940 B2 | 11/2005 | Krisko et al. |
| 7,004,986 B2 | 2/2006 | Kopec et al. |
| 7,008,467 B2 | 3/2006 | Krisko et al. |
| D520,619 S | 5/2006 | Kuempel et al. |
| 7,070,642 B2 | 7/2006 | Scott et al. |
| 7,090,708 B2 | 8/2006 | Winter |
| 7,090,711 B2 | 8/2006 | Gillingham et al. |
| 7,115,156 B2 | 10/2006 | Schaerlund et al. |
| 7,186,282 B2 | 3/2007 | Su |
| 7,282,075 B2 | 10/2007 | Sporre et al. |
| 7,329,326 B2 | 2/2008 | Wagner et al. |
| 7,332,009 B2 | 2/2008 | Casey et al. |
| 7,351,270 B2 | 4/2008 | Engelland et al. |
| 7,364,601 B2 | 4/2008 | Xu et al. |
| 7,396,375 B2 | 7/2008 | Nepsund et al. |
| 7,396,376 B2 | 7/2008 | Schrage et al. |
| 7,488,365 B2 | 2/2009 | Golden et al. |
| 7,520,913 B2 * | 4/2009 | Mills ................ B01D 46/002 55/529 |
| 7,524,349 B2 | 4/2009 | Schrage et al. |
| 7,537,631 B2 | 5/2009 | Scott et al. |
| 7,569,090 B2 | 8/2009 | Nelson |
| D600,790 S | 9/2009 | Nelson et al. |
| 7,625,419 B2 | 12/2009 | Nelson et al. |
| 7,641,708 B2 | 1/2010 | Kosmider et al. |
| 7,655,074 B2 | 2/2010 | Nepsund et al. |
| 7,674,308 B2 | 3/2010 | Krisko et al. |
| 7,682,416 B2 | 3/2010 | Engelland et al. |
| 7,713,321 B2 | 5/2010 | Kuempel et al. |
| RE42,174 E | 3/2011 | Gunderson et al. |
| D635,233 S | 3/2011 | Nelson |
| 7,905,936 B2 | 3/2011 | Coulonvaux et al. |
| 7,967,886 B2 | 6/2011 | Schrage et al. |
| 7,972,404 B2 | 7/2011 | Kuempel et al. |
| 7,972,405 B2 | 7/2011 | Engelland et al. |
| 7,981,183 B2 | 7/2011 | Nepsund et al. |
| 7,997,425 B2 | 8/2011 | Golden et al. |
| 8,016,903 B2 | 9/2011 | Nelson et al. |
| 8,034,145 B2 | 10/2011 | Boehrs et al. |
| 8,038,756 B2 | 10/2011 | Iddings et al. |
| 8,048,188 B2 | 11/2011 | Engelland et al. |
| 8,066,791 B2 | 11/2011 | Baseotto et al. |
| 8,128,724 B2 * | 3/2012 | Mills ................ B01D 46/002 55/529 |
| 8,142,533 B2 | 3/2012 | Gillenberg et al. |
| 8,147,576 B2 | 4/2012 | Gillenberg et al. |
| 8,147,582 B2 | 4/2012 | Engelland et al. |
| 8,152,876 B2 | 4/2012 | Gillenberg et al. |
| 8,163,056 B2 | 4/2012 | Coulonvaux et al. |
| 8,167,142 B2 | 5/2012 | Hacker |
| 8,177,872 B2 | 5/2012 | Nelson et al. |
| 8,182,569 B2 | 5/2012 | Casey et al. |
| 8,216,334 B2 | 7/2012 | Nelson et al. |
| 8,216,335 B2 | 7/2012 | Scott et al. |
| 8,226,786 B2 | 7/2012 | Schrage et al. |
| 8,273,143 B2 | 9/2012 | Coulonvaux et al. |
| 8,277,532 B2 | 10/2012 | Reichter et al. |
| 8,287,612 B2 | 10/2012 | Gillenberg et al. |
| 8,292,983 B2 | 10/2012 | Reichter et al. |
| 8,292,984 B2 | 10/2012 | Baseotto et al. |
| 8,328,897 B2 | 12/2012 | Nelson et al. |
| 8,357,219 B2 | 1/2013 | Boehrs et al. |
| 8,361,181 B2 | 1/2013 | Osendorf et al. |
| 8,382,876 B2 | 2/2013 | Engelland et al. |
| 8,404,029 B2 | 3/2013 | Lundgren et al. |
| 8,414,675 B2 | 4/2013 | Iddings et al. |

(56) References Cited

U.S. PATENT DOCUMENTS

| | | |
|---|---|---|
| 8,480,778 B2 | 7/2013 | Baseotto et al. |
| 8,493,723 B2 | 7/2013 | Sakata et al. |
| 8,499,749 B2 | 8/2013 | Mosset et al. |
| 8,545,588 B2 | 10/2013 | Iddings et al. |
| 8,557,007 B2 | 10/2013 | Read |
| 8,591,621 B2 | 11/2013 | Ruhland et al. |
| 8,663,355 B2 | 3/2014 | Nelson et al. |
| 8,714,142 B2 | 5/2014 | Jacob et al. |
| 8,741,017 B2 | 6/2014 | Nelson |
| 8,747,512 B2 * | 6/2014 | Mills .................... B01D 46/002 55/529 |
| 8,758,467 B2 | 6/2014 | Lundgren et al. |
| 8,808,417 B2 | 8/2014 | Engelland et al. |
| 8,814,973 B2 | 8/2014 | Baseotto et al. |
| 8,834,610 B2 | 9/2014 | Lundgren et al. |
| 8,840,699 B2 | 9/2014 | Bruce et al. |
| 8,864,866 B2 | 10/2014 | Osendorf et al. |
| 8,888,882 B2 | 11/2014 | Ackermann et al. |
| 8,906,128 B2 | 12/2014 | Reichter et al. |
| 8,920,530 B2 | 12/2014 | Ruhland et al. |
| 8,945,268 B2 | 2/2015 | Nelson et al. |
| 9,120,047 B2 | 9/2015 | Boehrs et al. |
| 9,180,399 B2 | 11/2015 | Reichter et al. |
| 9,217,399 B2 | 12/2015 | Engelland et al. |
| 9,221,004 B2 | 12/2015 | Iddings et al. |
| 9,238,189 B2 | 1/2016 | Baseotto et al. |
| 9,289,712 B2 | 3/2016 | Nelson et al. |
| 9,308,482 B2 | 4/2016 | Kaiser |
| 9,353,658 B2 | 5/2016 | Jacob et al. |
| 9,387,425 B2 | 7/2016 | Osendorf et al. |
| 9,387,428 B2 | 7/2016 | Osendorf et al. |
| 9,399,972 B2 | 7/2016 | Boehrs et al. |
| 9,440,177 B2 | 9/2016 | Wood et al. |
| 9,446,339 B2 | 9/2016 | Rieger et al. |
| 9,463,404 B2 | 10/2016 | Rieger |
| 9,504,949 B2 | 11/2016 | Lundgren et al. |
| 9,527,023 B2 | 12/2016 | Reichter et al. |
| 9,579,596 B2 | 2/2017 | Rieger et al. |
| 9,610,529 B2 * | 4/2017 | Mills .................... B01D 46/002 |
| 9,636,615 B2 | 5/2017 | Osendorf et al. |
| 9,943,797 B2 | 4/2018 | Nelson et al. |
| 2002/0096247 A1 | 7/2002 | Wydeven et al. |
| 2002/0112458 A1 | 8/2002 | Schneider |
| 2002/0158006 A1 | 10/2002 | Thomas |
| 2003/0146149 A1 | 8/2003 | Binder et al. |
| 2004/0035097 A1 | 2/2004 | Schelnsker et al. |
| 2004/0159239 A1 | 8/2004 | Nagem |
| 2004/0187689 A1 | 9/2004 | Sporre et al. |
| 2005/0130508 A1 | 6/2005 | Yeh |
| 2005/0166561 A1 | 8/2005 | Schrage et al. |
| 2005/0252848 A1 | 11/2005 | Miller |
| 2006/0174598 A1 | 8/2006 | Mills et al. |
| 2006/0288676 A1 | 12/2006 | Geyer, III |
| 2007/0039296 A1 | 2/2007 | Schrage et al. |
| 2007/0235384 A1 | 10/2007 | Oku et al. |
| 2008/0041026 A1 | 2/2008 | Engel et al. |
| 2008/0110142 A1 | 5/2008 | Nelson et al. |
| 2008/0115758 A1 | 5/2008 | Engelland et al. |
| 2008/0190082 A1 | 8/2008 | Scott et al. |
| 2008/0257161 A1 | 10/2008 | Read |
| 2008/0282890 A1 | 11/2008 | Rocklitz et al. |
| 2008/0307759 A1 | 12/2008 | Reichter et al. |
| 2009/0064646 A1 | 3/2009 | Reichter et al. |
| 2009/0094951 A1 | 4/2009 | Baseotto et al. |
| 2009/0100813 A1 | 4/2009 | Iddings et al. |
| 2009/0127211 A1 | 5/2009 | Rocklitz et al. |
| 2009/0151311 A1 | 6/2009 | Reichter et al. |
| 2009/0211450 A1 | 8/2009 | Mosset et al. |
| 2009/0217632 A1 | 9/2009 | Coulonvaux et al. |
| 2009/0301045 A1 | 12/2009 | Nelson et al. |
| 2010/0031616 A1 | 2/2010 | Gillingham et al. |
| 2010/0032365 A1 | 2/2010 | Moe et al. |
| 2010/0043366 A1 | 2/2010 | Boehrs et al. |
| 2010/0044295 A1 | 2/2010 | Honermann et al. |
| 2010/0064646 A1 | 3/2010 | Smith |
| 2010/0146917 A1 | 6/2010 | Coulonvaux et al. |
| 2010/0146919 A1 | 6/2010 | Nelson |
| 2010/0146920 A1 | 6/2010 | Iddings et al. |
| 2010/0293906 A1 | 11/2010 | Flagstad et al. |
| 2011/0017657 A1 | 1/2011 | Jokschas et al. |
| 2011/0094197 A1 | 4/2011 | Ruhland et al. |
| 2011/0173937 A1 | 7/2011 | Nelson |
| 2011/0232244 A1 | 9/2011 | Schrage et al. |
| 2011/0247582 A1 | 10/2011 | Blossey et al. |
| 2011/0308212 A1 | 12/2011 | Ruhland et al. |
| 2013/0263744 A1 | 10/2013 | Osendorf et al. |
| 2014/0102058 A1 | 4/2014 | Kaufmann et al. |
| 2014/0208702 A1 | 7/2014 | Lundgren et al. |
| 2014/0215982 A1 | 8/2014 | Wood et al. |
| 2014/0260143 A1 | 9/2014 | Kaiser |
| 2015/0101299 A1 | 4/2015 | Osendorf et al. |
| 2017/0001134 A1 | 1/2017 | Rieger et al. |

FOREIGN PATENT DOCUMENTS

| | | |
|---|---|---|
| DE | 202008017059 U1 | 5/2010 |
| EP | 0 082 106 | 6/1863 |
| EP | 0 164 956 A1 | 12/1985 |
| EP | 1 106 232 | 6/2001 |
| FR | 2 214 505 | 1/1973 |
| GB | 2 222 964 A | 3/1990 |
| JP | 2004-136203 | 5/2004 |
| WO | WO 2004/007054 A1 | 1/2004 |
| WO | WO 2004/071616 | 8/2004 |
| WO | WO 2004/082795 A2 | 9/2004 |
| WO | WO 2005/063361 A1 | 7/2005 |
| WO | WO 2005/077487 A1 | 8/2005 |
| WO | WO 2005/079954 | 9/2005 |
| WO | WO 2007/044677 | 4/2007 |
| WO | WO 2008/157251 | 12/2008 |
| WO | WO 2009/014986 | 1/2009 |
| WO | WO 2014/194275 | 12/2014 |

OTHER PUBLICATIONS

Declaration of Inventor Randall Engelland dated Dec. 17, 2013.
European Search Report and Search Opinion, dated Jan. 27, 2011.
Pending claims of U.S. Appl. No. 14/297,738 dated Apr. 3, 2017.
Pending claims of U.S. Appl. No. 14/518,102 dated Apr. 3, 2017.
Pending claims of U.S. Appl. No. 15/204,104 dated Apr. 3, 2017.
Pending claims of U.S. Appl. No. 15/075,812 dated Apr. 3, 2017.
Pending claims of U.S. Appl. No. 14/892,812 dated Apr. 3, 2017.
U.S. Appl. No. 61/712,454, filed Oct. 2012.
U.S. Appl. No. 61/565,114, filed Nov. 2011.
U.S. Appl. No. 61/551,741, filed Oct. 2011.
Pending claims of U.S. Appl. No. 15/204,104 dated Oct. 31, 2018.
Pending claims of U.S. Appl. No. 15/918,664 dated Oct. 31, 2018.
Pending claims of U.S. Appl. No. 14/892,812 dated Oct. 31, 2018.
Pending claims of U.S. Appl. No. 14/892,846 dated Oct. 31, 2018.

* cited by examiner

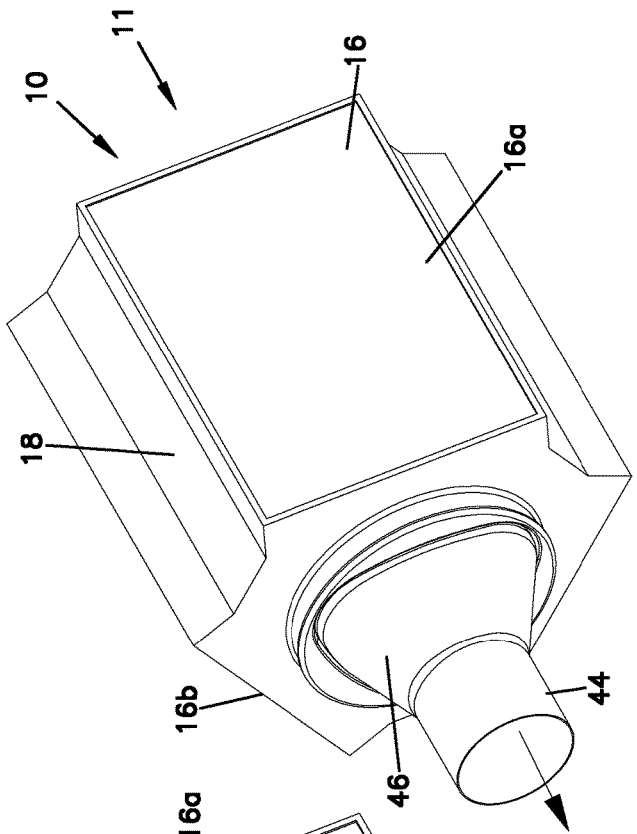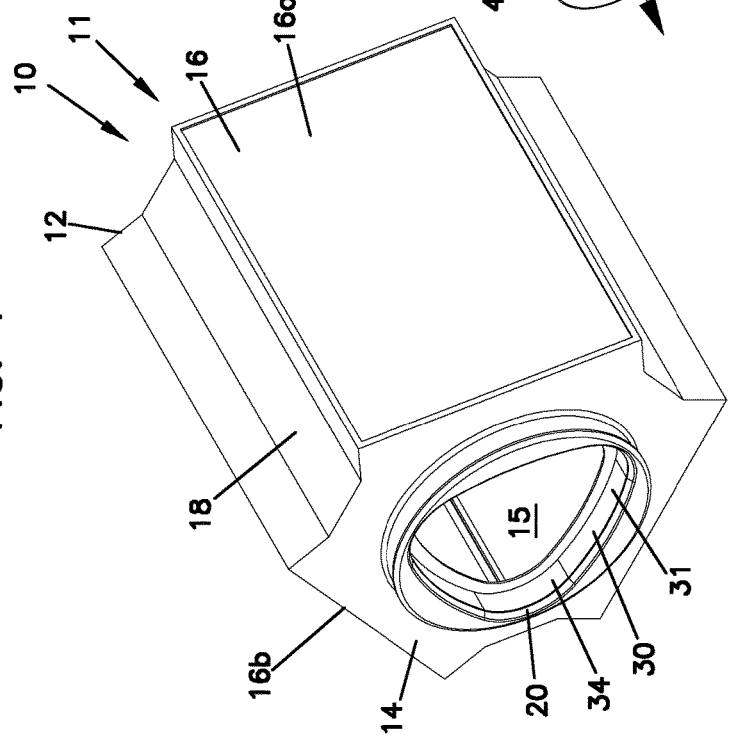

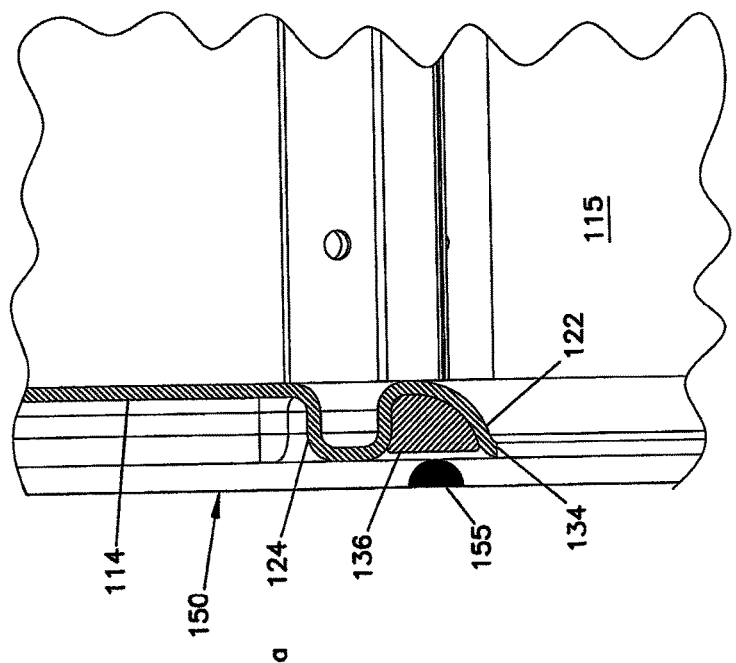
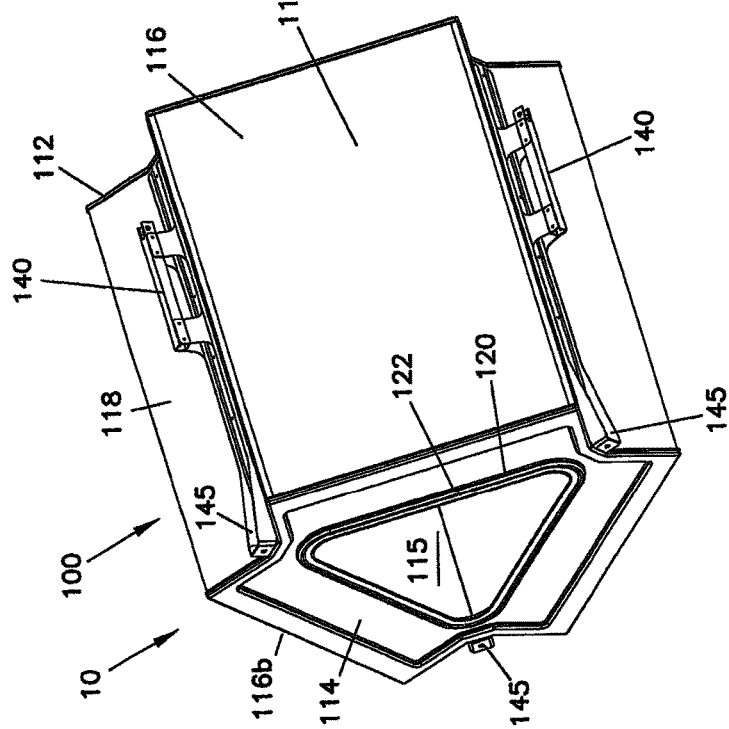

FILTER ELEMENTS; AIR FILTER ARRANGEMENTS; AND, METHODS

This application is a continuing application of U.S. Ser. No. 14/297,738, filed Mar. 6, 2014, now U.S. Pat. No. 9,610,529. U.S. Ser. No. 14/297,738 is a continuation of U.S. Ser. No. 13/412,076, filed Mar. 5, 2012. U.S. Ser. No. 13/412,076, which issued as U.S. Pat. No. 8,747,512, is a continuation of U.S. Ser. No. 12/386,482, filed Apr. 16, 2009, which has issued as U.S. Pat. No. 8,128,724. U.S. Ser. No. 12/386,482 is a continuing application of Ser. No. 11/275,904, filed Feb. 2, 2006, which has issued as U.S. Pat. No. 7,520,913. U.S. Ser. No. 11/275,904 claimed priority to U.S. Ser. No. 60/650,019, filed Feb. 4, 2005 and U.S. Ser. No. 60/733,978, filed Nov. 3, 2005. A claim of priority is made to each of U.S. Ser. No. 14/297,738; U.S. Ser. No. 13/412,076; U.S. Ser. No. 12/386,482; U.S. Ser. No. 11/275,904; U.S. Ser. No. 60/650,019; and, U.S. Ser. No. 60/733,978, to the extent appropriate. The complete disclosures of applications U.S. Ser. No. 14/297,738; U.S. Ser. No. 13/412,076; U.S. Ser. No. 12/386,482; U.S. Ser. No. 11/275,904; U.S. Ser. No. 60/650,019 and U.S. Ser. No. 60/733,978 are incorporated by reference herein.

FIELD

The present invention relates to a fluid filter for removing contaminants from a gaseous stream, such as an air stream.

BACKGROUND

Filter elements are used in many industries to remove airborne contaminants to protect people, the environment, and often, a critical manufacturing process or the products that are manufactured by the process.

There is always a need to design different filter elements.

SUMMARY OF THE INVENTION

Non-cylindrical filter elements are provided. Preferably, the filter elements have at least two flat or planar filtration panels. Fluid, such as air, to be filtered enters the filter element through the panels, preferably through each of the panels. An outlet aperture is provided, which has generally the same shape as the cross-sectional shape of the filter. A filter element having three filter elements will be generally triangular in shape and have a generally triangular outlet aperture.

The design of the present filter element can be such that both axial and radial seals are formed between the outlet aperture and any outlet duct or piping. The filter element can include an integrally molded outlet flange or collar for connecting to an outlet duct.

Various problems are solved by the design of the present disclosure. The filter element of the present disclosure, by having a non-circular outlet aperture, increases the outlet area to thus decrease outlet velocity and decrease pressure drop. The non-circular cross-section limits the possible orientations for adjoining ductwork, which is desired for some installations; a circular outlet has infinite orientations, which may be a non-preferred configuration for some installations.

BRIEF DESCRIPTION OF THE DRAWINGS

Referring now to the drawings, wherein like reference numerals and letters indicate corresponding structure throughout the several views:

FIG. 1 is a perspective view of a filter element according to the present invention;

FIG. 2 a perspective view of the filter element of FIG. 1 operably connected to an outlet duct;

FIG. 5 is a perspective view of a second embodiment of a filter element according to the present invention;

FIG. 6C is a cross-sectional view of a portion of the filter element of FIG. 6A taken along line 6-6.

DETAILED DESCRIPTION

Referring now to the Figures, a filter element according to the present invention is shown at 10 in FIGS. 1 through 4B. Filter element 10 is a fluid filter; that is, filter element 10 filters out or removes contaminants from a fluid stream. In many embodiments, filter element 10 is a gas filter, configured for removal of contaminants from a gas stream. In most embodiments, the gas being filtered is air. Filter element 10 is particularly suitable for use in an aircraft or other lightweight vehicle, for filtering cabin air. In a passenger aircraft, filter element 10 would generally be located in a cargo hold, below the passenger cabin.

In use, filter element 10, in many embodiments, is removably positioned in a housing, duct, or other structure. The housing, duct or other structure may or may not complete enclose or envelope filter element 10.

Figure 4B:
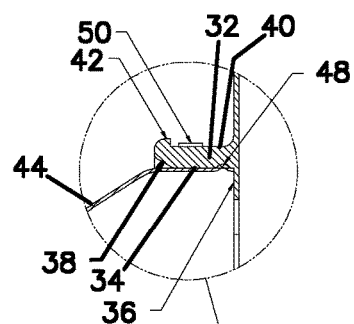
FIG. 4B is an enlarged section of a portion of FIG. 4A detailing the outlet seal.
Figure 4A:
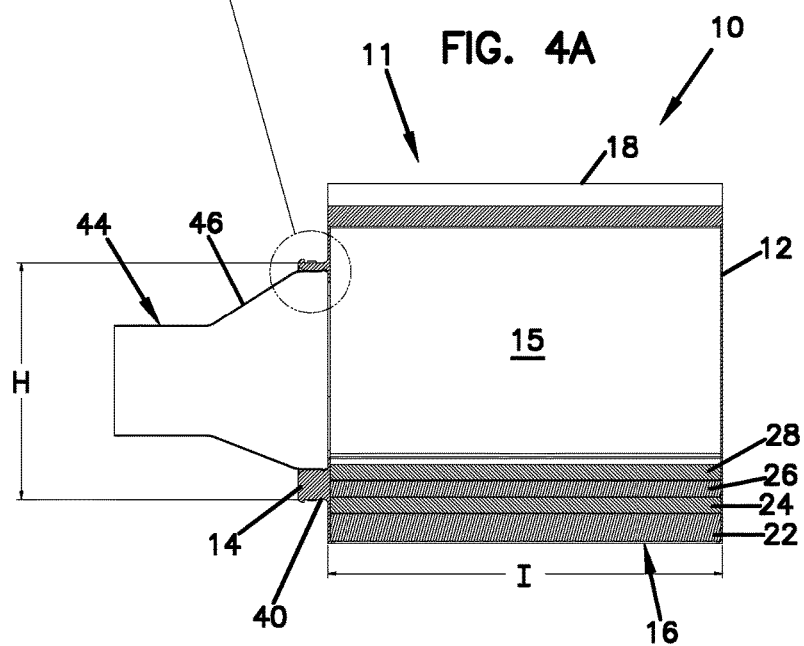
FIG. 4A is a cross-sectional view of the filter element taken along line 4-4 of FIG. 3A, the filter element including the outlet duct thereon.
Figure 6B:
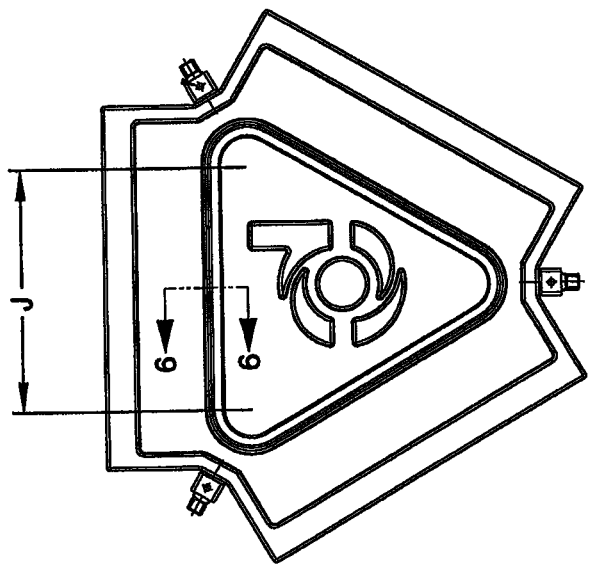
FIG. 6B is similar to FIG. 6A.
Figure 6A:
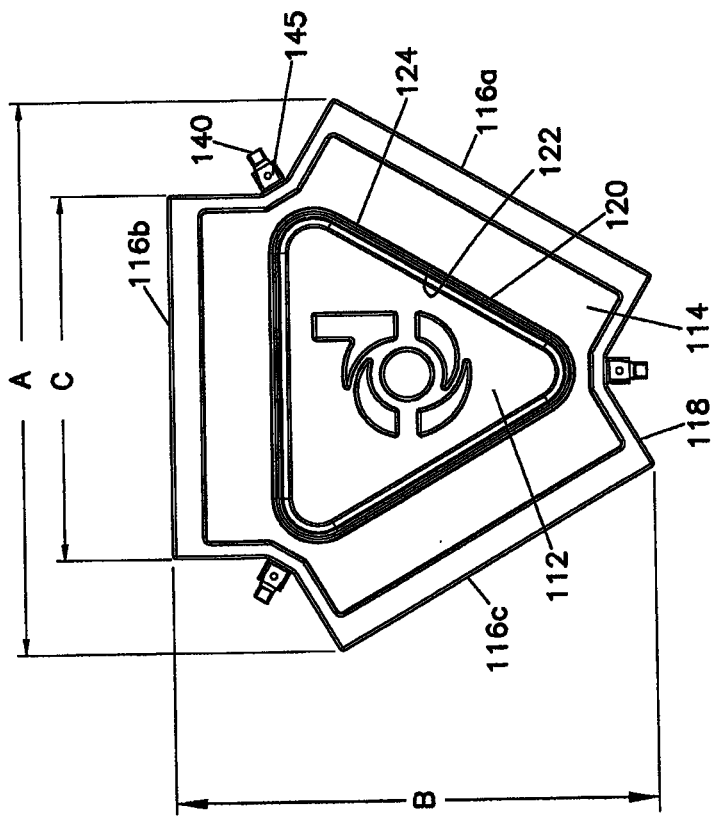
FIG. 6A is an end view of the filter element of FIG. 5.

Filter element 10 has a first end 12 and an opposite second end 14. Filter element includes filtration panels 16 and support structure 18, which will be described below. Together, panels 16 and support structure 18, between first end 12 and second end 14, define a filter interior 15. Panels 16 provide fluid access into and out from interior 15. Second end 14 includes an aperture 20, which provides fluid access to and from interior 15. In FIGS. 2, 4A and 4B, a duct 44 is attached to aperture 20. In the preferred configuration, panels 16 provide fluid access into interior 15, and are thus the inlet into interior 15 of filter 10. Thus, fluid to be filtered passes through panels 16 and panels 16 provide filtration. In line with panels 16 being the inlet into filter 10, aperture 20 provides access out from interior 15, and thus is the outlet from interior 15 of filter 10. Panels 16 are radially positioned in relation to interior 15, and aperture 20 is axially positioned in relation to interior 15. With such a configuration, the fluid being filtered changes direction, e.g., turns, when moving from panels 16 (e.g., the inlet) to aperture 20 (e.g., the outlet). Generally, no air or other fluid passes out from interior 15 through panels 16.

Filter element 10 is generally a non-cylindrical element. In the particular embodiment illustrated, filter element 10 is a three-sided filter element 11, composed of three panels 16, which are generally flat or planar. By the terms "generally flat" or "generally planar", what is intended it that the panel may not be completely flat or planar (i.e., having a surface angle of 0 degrees), but may include a slight dip, indentation variation, bend, or the like on its surface or structure; overall, the overall surface angle of a "generally planar" or "generally flat" panel, from end-to-end, is no more than 10 degrees, preferably no more than 5 degrees. In some embodiments, filter element 10 has no rounded or curved surfaces, e.g., panels 16, that provide filtration.

Filter element 10 includes at least two filtration portions or panels 16; preferably filter element 10 includes at least three filtration panels 16. For three-sided filter element 11, panels 16 are indicated as first panel 16a, second panel 16b, and third panel 16b. It is understood that filter element 10 could have any number of panels 16, however, as the number of panels 16 increases the cost of designing and assembling such a filter 10 generally increases, thus, less panels 16 are preferred. Preferred numbers of panels 16 include three, four, six, and eight.

The at least two panels 16 are positioned angled to other or they may be opposite each other. The at least two panels 16 may be evenly spaced. For example, a filter element having two panels 16 may have the panels 16 opposite to and parallel to each other. As another example, filter element 10 has three panels 16a, 16b, 16c spaced apart approximately 120 degrees. Alternately, a filter element having two panels 16 may have panels 16 angled with respect to each other, for example, at an angle of 90 degrees. It is understood that other degrees, other than 0 degrees (i.e., having the panels 16 planar to or co-planar with each other), are suitable.

Preferably, each of panels 16a, 16b, 16c is the same size, shape and filtration material, although it is not necessary that all panels have the same size, shape and/or filtration material. Panels 16 are planar or flat; that is, they are not rounded or curved. The planar or flat characteristic is due to the rigid material used for panels 16. In future embodiments, it may be possible to provide non-planar or curved panels, however, the present application is directed to using planar, non-curved filtration panels 16.

Panels 16 are held together by a support structure 18, which can be any combination of suitable frames, pieces, and materials to provide support to panels 16 and define interior 15 and aperture 20. Examples of suitable materials for any portion of support structure 18 include metals (e.g., aluminum, titanium), polymeric or plastic materials (e.g., polyethylene, polyethylene terephthalate, polypropylene, polycarbonate, urethane or polyurethane), composite materials, or any combinations thereof.

In one embodiment, support structure 18 includes aluminum metal bent as a frame to support panels 16 and a hard polymer material molded to engulf the metal frame and seal interior 15 from the exterior of element 10. In another embodiment, support structure 18 includes hard plastic molded as a frame to support panels 16 and a soft polymer material molded to engulf the hard plastic frame and seal interior 15 from the exterior of element 10. Support structure 18 may include details and features to attach filter 10 to mounting brackets or other supporting structures.

Panels 16 of filter element 10 (or, for the specific embodiment illustrated, panels 16a, 16b, 16c of filter element 11) filter particulate and chemical contaminants from the fluid passing therethrough. Panels 16 may include a single feature or layer that accomplishes both chemical and particulate removal from the fluid passing therethrough. However, as in a preferred embodiment, panels 16 include multiple features or layers. Referring to FIG. 4A, panel 16c is illustrated having four layers, first media layer 22, second media layer 24, third medial layer 26 and fourth media layer 28.

A first example of a suitable layer, for any of media layers 22, 24, 26, 28 is a low pressure drop, rigid article having a plurality of passages therethrough, the passages having surfaces with adsorptive material. Fluid passes through the passages following the direction of the passage, which is generally in a straight line. Contaminants present in the fluid are adsorbed, absorbed, trapped, retained, reacted, or otherwise removed from the fluid by the adsorptive material. The rigid article can be configured for removal of specific contaminants. For example, the article can be designed for the removal of acidic materials, of basic materials, organic materials, or any combination thereof.

Examples of such rigid articles are taught in U.S. Pat. No. 6,645,271 (Sequin et al.), the entire disclosure of which is incorporated herein by reference. Pending U.S. patent application Ser. No. 10/947,732 (Ding et al.), filed Sep. 23, 2004 entitled "Adsorptive Filter Element and Methods" provides rigid elements specifically designed for the removal of carbonyl-containing compounds; this application is incorporated herein by reference. It is understood that the rigid elements, or any of the filtration elements described herein, can be modified from their original design to obtain the desired properties for this application. For example, at anytime during the manufacturing process of rigid articles, the substrate of the articles may be treated to obtain the desired final characteristics for the articles. For example, an aluminum substrate may be etched or otherwise treated to increase the adhesion of a binder to the surface, or for other reasons.

Another example of a suitable layer for any of media layers 22, 24, 26, 28 is a low pressure drop fibrous article having a plurality of passages therethrough, the fibrous material having been impregnated with various materials to adsorb, absorb, or react with contaminants. Pending U.S. patent application Ser. No. 10/928,776 (Dallas et al.), filed Aug. 27, 2004 entitled "Acidic Impregnated Filter Element, and Methods" provides impregnated porous elements specifically designed for the removal of basic or alkaline compounds; this application is incorporated herein by reference. Pending U.S. patent application Ser. No. 10/927,708 (Dallas et al.), filed Aug. 27, 2004 entitled "Alkaline Impregnated Filter Element, and Methods" provides impregnated porous elements specifically designed for the removal of acidic compounds; this application is incorporated herein by reference. Pending U.S. patent application Ser. No. 11/016,013 (Ding et al.), filed Dec. 17, 2004 entitled "Impregnated Filter Element, and Methods" provides impregnated porous elements specifically designed for the removal of carbonyl-containing compounds; this application is incorporated herein by reference. Additional details regarding removal of alkaline materials, acidic materials, carbonyl-containing compounds, and organics, are provided in pending PCT application Ser. No. 05/30577, filed Aug. 25, 2005.

A third example for a suitable layer for any of media layers 22, 24, 26, 28 is a fibrous or particulate filtration layer. Suitable examples of a particulate layer include mats of randomly placed non-woven fibers, thin layers of conventional filtration media, and pleated conventional filtration media. A preferred filtration media to use is HEPA media.

HEPA filters are known in the art of filters as "high-efficiency particulate air" filters. HEPA media is the media of the filter that provides the filtration efficiency. HEPA media has a minimum efficiency of 99.97% removal when tested with essentially monodispersed 0.3 micron particles. The media may be any suitable HEPA media and may be made from cellulose, polymeric materials (e.g., viscose, polypropylene, polycarbonate, etc.), glass or fiberglass, or natural materials (e.g., cotton). Other HEPA media materials are known. Microfibrous glass is a preferred material for HEPA media. A suitable HEPA media for aircraft applications is that commercially available as H&V "HB-7633".

Any of the fibrous or media materials may be electrostatically treated and/or include one or more layers of material. One or more layers of fine fiber, such as taught by U.S. Pat. No. 6,673,136 (Gillingham et al.), may be included.

Any or all of these various media layers may be provided in any order to provide panel 16.

Referring again to FIG. 4A, panel 16 is illustrated as having first media layer 22, second media layer 24, third media layer 26 and fourth media layer 28. In a preferred construction, first media layer 22 is a pleated HEPA filter element configured for particulate removal, second media layer 24 is a rigid media having impregnated absorbent materials (such as taught by U.S. Pat. No. 6,645,271), third media layer 26 is a rigid media having impregnated absorbent material (such as taught by U.S. Pat. No. 6,645,271), and fourth media layer 28 is a rigid media configured for carbonyl-containing compound removal, particularly for aldehyde removal (such as taught by U.S. patent application Ser. No. 10/947,732). Thus, in use, fluid to be filtered would first pass through the HEPA filter, then through two rigid layers to remove acids and bases, and then through a layer to remove aldehydes. It is understood that this is an exemplary configuration for the media layers, and that other arrangements are suitable. For example, none, one, two, or any number of the media layers may be rigid and/or impregnated, or the various layers may be impregnated with different materials and/or arranged to provide a different path through the layers.

The filtered fluid, such as air, arrives in interior 15 of filter element 10. From interior 15, the fluid exits filter element 10 via aperture 20.

Aperture 20 is present at second end 14 of element 10. Aperture 20 includes an outlet aperture 30 that provides access into and out from interior 15. In the particular embodiment, outlet aperture 30 is a three-sided outlet aperture 31, as will be further described below. Surrounding aperture 30 is an outlet collar or flange 32. Collar 32 preferably has a circular outer perimeter, for reasons which will be described later.

Outlet aperture 30 preferably has the same number of sides as there are number of panels 16. For three-sided filter element 11, the aperture is a three-sided outlet aperture 31. Aperture 31, and any non-round aperture 30, need not be a true polygon, but can include rounded or curved sides and/or corners. See for example, FIG. 3A. Aperture 31 has a general triangular shaped, but with rounded angles or corners and curved sides; aperture 31 could be referred to as having a tri-oval or a tri-lobal shape.

The shape of outlet aperture 30 is selected to correspond to the overall shape of filter element 10, which is dependent on the number of panels 16. Outlet aperture 30 preferably follows the same general shape as interior 15, formed by panels 16 and support structure 18. Having outlet aperture 30 generally correspond to the shape of interior 15 allows a larger outlet aperture area than if a circular outlet were used. For example, for aperture 31, the three corners extend farther out than would a circular outlet, thus obtaining more outlet area. Increased outlet area is desired as it decreases the velocity of the exiting fluid, thus decreasing pressure losses.

Figure 3B:
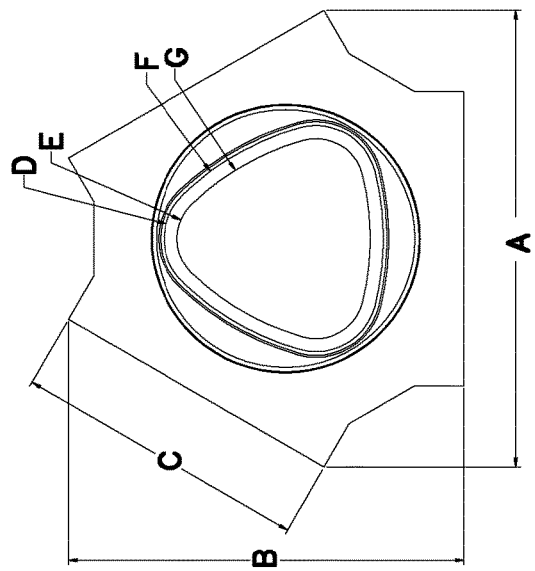
FIG. 3B is similar to FIG. 3A.
Figure 3A:
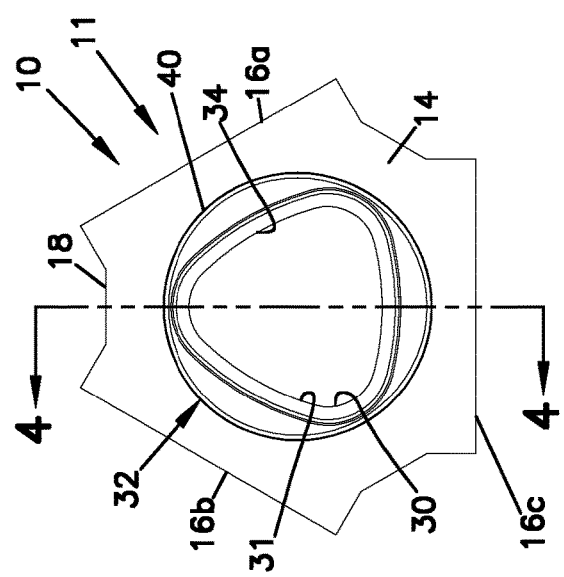
FIG. 3A is an end view of the filter element of FIG. 1.

Collar 32 is configured to receive duct 44 (see FIGS. 2 and 4A) and provide a leak-free seal therebetween. The particular configuration of collar 32 provides both axial and radial sealing to duct 44. As best seen in FIGS. 3A and 4B, collar 32 includes an inner perimeter surface 34, a stop or longitudinal surface 36, a chamfered edge 38 on the inner surface 34, and outer perimeter surface 40 opposite inner surface 34, and a retaining lip 42 at outer surface 40. Inner surface 34, stop 36 and chambered edge 38 have the same general shape as aperture 30, which in the illustrated embodiment, is aperture 31. Outer perimeter surface 40 and retaining lip 42 have a generally circular shape.

Collar 32 can be formed, typically molded, together with support structure 18; collar 32 may be integral with support structure 18. Such a configuration eliminates the need for a separate flange to be attached to filter element 10.

Referring to FIGS. 2 and 4A, duct 44 is configured to fit within collar 32 and specifically, within inner perimeter surface 34. Duct 44 is specifically configured to fit with the tri-oval or tri-lobal shape of aperture 31. By having duct 44 formed to the same shape as aperture 31, only three proper orientations of duct 44 are available, which in some configurations is more preferable than an infinite number of orientations, which would be the case if the duct was circular and formed to a circular outlet aperture. Duct 44 includes a transition region 46, which changes from tri-oval or tri-lobal to circular, thus allowing filter element 11 to be connected to circular ductwork.

To connect duct 44 to filter element 10 via aperture 20, as illustrated in FIGS. 4A and 4B, duct 44 is slid into collar 30, facilitated by chamfered surface 38. Duct 44 is pushed in to seal against both inner surface 34 and stop 36. A radial seal is formed between duct 44 and inner surface 34 and an axial seal is formed between duct 44 and stop 36. A band clamp 50 (seen in FIG. 4B) is used to tighten against collar 30 and duct 44. Band clamp 50 is positioned on collar 32 against outer surface 40, between retaining lip 42 of collar 32 and bead 48 on duct 44. Positioning between lip 42 and bead 48 improves the stability of clamp 50 and reduces the chance of it pulling off.

As stated above, collar 32 has a circular outer perimeter. When band clamp 50 is positioned on collar 32 behind retaining lip 42, band clamp 50 contacts collar 32 continuously around the perimeter and, thus, the pressure exerted by band clamp 50 is a uniformly distributed load around collar 32 and duct 44.

Referring to FIGS. 5 and 6A, 6B, 6C, a second embodiment of a filter element 10 according to the present invention is illustrated. The particular embodiment of filter element 10 of these figures is filter element 100. It is to be understood that any of the features from filter element 10 could be used for filter element 100, in any combination, and vice versa.

Filter element 100 has a first end 112 and an opposite second end 114. Filter element includes filtration panels 116 and support structure 118. Together, panels 116 and support structure 118, between first end 112 and second end 114, define a filter interior 115. Panels 116 provide fluid access into and out from interior 115, thus providing an inlet into interior 115. Second end 114 includes an aperture 120, which provides fluid access to and from interior 115, and thus providing and outlet from interior 115. In this embodiment, first end 112 includes indicia thereon; it is understood that any filter element embodiment may include indicia, or, no indicia may be present. Such indicia can be used to identify the manufacturer of filter element 100, or to convey, for example, installation instructions.

Filter element 100 is a non-cylindrical element, particularly, a three-sided filter element composed of three planar or flat panels 116. Filter element 100 has no rounded or curved surfaces that provide filtration.

Filter element 100 includes at least two filtration portions or panels 116; in this embodiment, filter element 100 has three panels 116, which are indicated as first panel 116a, second panel 116b, and third panel 116b. Preferably, each of panels 116a, 116b, 116c is the same size, shape and filtration material, although it is not necessary that all panels have the same size, shape and/or filtration material. Panels 116 are preferably planar or flat; that is, they are not rounded or curved.

Panels 116 filter particulate and chemical contaminants from the fluid passing therethrough. Panels 116 may include a single feature or layer that accomplishes both chemical and particulate removal from the fluid passing therethrough. Although not specifically illustrated, each panel 116 of this embodiment is composed of multiple layers, similar to filter element 11. The same materials suitable for panels 16 are suitable for panels 116.

Aperture 120 of filter element 100 provides access into and out from interior 115. In the particular embodiment, aperture 120 is a three-sided outlet aperture, as will be further described below, defined by structure 122, which is similar to collar 32 of filter element 11 in many aspects. Structure 122 includes an outer surface 124 and an inner perimeter surface 134. In this embodiment, outer surface 124 and inner surface 134 of structure 122 have generally the same shape, i.e., they are both generally triangular, unlike for filter element 11 wherein outer surface 40 is generally circular and inner surface 34 is generally triangular.

Aperture 120 and structure 122 have the same number of sides as there are number of panels 116, i.e., three for this embodiment. Aperture 120 and structure 122 have a generally triangular shape, but with rounded angles or corners. The shape of aperture 120, and in this embodiment, of structure 122, is selected to correspond to the overall shape of filter element 100.

Referring to FIG. 6C, an enlarged of a portion of structure 122 is illustrated, in close proximity to a mounting bracket 150, onto which filter element 100 will be seated. As provided above, structure 122 is similar to collar 32 of filter element 11, except that, for example, structure 122 does not extend away from structure 118 in the same manner that collar 32 extends away from structure 18. Structure 122 includes a channel, trough, or other recessed area which retains a seal 136.

Structure 122, in particular seal 136, has a low or no-clearance; that is, structure 122 extends no more than about 1 cm, preferably no more than about 0.5 cm, past support structure 118 of filter element 100. In preferred embodiments, structure 122 is flush with or recessed in toward end 114.

In use, filter element 100 will be operably sealed against bracket 150 at structure 122, in particular at seal 136, to provide a leak-free seal. Bracket 150 includes a protrusion 155 extending toward filter element 100. Protrusion 155 can be a radiused or sloped bead, and have a height of at least about 0.1 cm (1 mm), or at least about 0.25 cm.

Prior to use, filter element 100 is slid into placed against bracket 150. Having structure 122 with a low or no-clearance facilitates sliding filter element 100 into its position, with minimal clearance needed between bracket 150 and filter element 100.

When properly seated, filter element 100, via seal 136, forms an axial seal with bracket 150. Depending on the configuration of protrusion 155, a radial seal may also be formed. Seal 136 is sufficiently deformable, flexible and/or resilient to allow protrusion 155 to embed into seal 136; seal 136 is generally a low-durometer material. Examples of suitable material for seal 136 include urethanes, polyethylenes, silicone, rubbers, and other similar materials. Seal 136 may be, for example, a rolled seal, may be formed-in-place, such as by a one-component or multiple-component foam or gel that is poured into place. The engagement of seal 136 with protrusion 155 and bracket 150 should be a continuous seal, with no breaks.

Filter element 100 may be seated in a generally horizontal position, as illustrated in the figures, with the outlet being generally horizontal out from interior 115, or, filter element 100 may be seated in a generally vertical position, with the outlet being generally vertical above or below interior 115.

Filter element 100 includes three mounting elements 140 and three mounting elements 145. In this embodiment, mounting elements 140 function both as handles, to facilitate moving and lifting of filter element 100, and as mounting mechanisms, to mount and lock filter element in a desired position, for example, for use. Mounting elements 145 also mount and lock filter element 100 in the desired position. It is not necessary that all three mounting elements 140 and three mounting elements 145 are used; this will depend on the housing, duct, or other structure to which filter element 100 is mounted. For example, only two mounting elements 140 together with all three mounting elements 145 may be used. Other configurations of mounting elements can also be used.

It is understood that mounting elements 140 may be used for mounting of element 100 and a separate structure can be used to facilitate moving and lifting of the filter element, or, mounting elements 140 may be used solely as handles.

Referring to the reference numerals in FIGS. 3B, 4A, 6A and 6B, the following properties and dimensions are suitable examples for filter elements 10, 100.

| | Filter element 10 | filter element 100 |
|---|---|---|
| Panel size | 17.5 × 25 inches | |
| # of panels 16 | 3 | 3 |
| panel thickness | 4.6 inches | |
| # layers in panel 16 | 4 | |
| layer 1 | pleated HEPA filter (having a thickness of about 1.5 inches) with hot melt adhesive spacer beads between the pleats | pleated HEPA filter (having a thickness of about 1.5 inches) |
| layer 2 | rigid absorption filtration media layer (having a thickness of about 1.04 inches) | |
| layer 3 | rigid absorption filtration media layer (having a thickness of about 1.04 inches) | |
| layer 4 | rigid absorption filtration media layer (having a thickness of about 1.04 inches) | |
| A | 25.31 inches | 25.96 inch |
| B | 22.75 inches | 22.53 inches |
| C | 17.00 inches | 17.14 inches |
| D | 3.80 inch radius | |
| E | 2.75 inch radius | |
| F | 16.00 inch radius | |
| G | 15.25 inch radius | |
| H | 15.00 inch diameter | |
| I | 25.00 inches | 25.00 inches |
| J | | 11.56 inches |

Additionally, for an embodiment of filter element 10, the widest dimension, in one direction, is about 26.3 inches, and, in another direction, is about 22.8 inches. Additionally, in this embodiment, collar 32 extend pasts panels 16 by about 2 inches. The approximate diameter of aperture 31 is 15.25 inches, with the corners of aperture 31 being radiused to 2.75 inches. Such an outlet aperture has an area of about 94.7 square inches; a comparable circular outlet would have an area of about 38.5 square inches. Circumscribing aperture 31 is an outer surface 40, which follows the shape of aperture 31. Outer surface 40 has an approximate diameter of 10 inches with the corners being radiused to 3.5 inches.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed:

1. An air filter element comprising:
   (a) an open filter interior having a first, closed, end and an open end opposite the first, closed, end; the open end having an air flow aperture therethrough;
   (b) filter media; and,
   (c) a seal arrangement including a non-circular sealing surface positioned at the open end of the filter element;
      (i) the sealing surface having a non-circular shape comprising at least three, spaced, radially outwardly directed lobes with non-straight seal surface sections extending therebetween; and,
      (ii) the sealing surface being configured and directed to form a radially directed seal.

2. An air filter element according to claim 1 wherein:
   (a) the element includes, at the open end, a portion having a sealing surface configured to form a second sealing surface.

3. An air filter element according to 2 wherein:
   (a) the portion configured to form a second sealing surface is configured to form an axial seal.

4. An air filter element according to claim 2 wherein:
   (a) the media includes one or more layers of fine fiber thereon.

5. An air filter element according to claim 1 wherein:
   (a) the filter media is pleated.

6. An air filter element according to claim 1 wherein:
   (a) the filter media comprises at least one planar filter panel.

7. An air filter element according to claim 6 wherein:
   (a) the filter media comprises at least one rectangular filter panel.

8. An air filter element according to claim 6 wherein:
   (a) the filter media comprises multiple rectangular filter panels.

9. An air filter element according to claim 1 wherein:
   (a) the sealing surface is configured to form a radially inwardly directed sealing engagement.

10. A filter element comprising:
    (a) at least one, generally planar, filter panel;
    (b) a support structure supporting the at least one generally planar, filtration panel and defining a filter interior;
       (i) the support structure having a first, closed, end and a second, opposite, end with an outlet aperture therein;
       (ii) the generally planar filter panel being supported by the support structure: at a location between the first, closed end and the second, opposite, end; and, being oriented to direct air flow through the at least one generally planar filter panel toward a location in the filter interior between the first closed end and the second, opposite, end; and,
       (iii) the outlet aperture being a non-circular outlet aperture defined by the support structure; and,
    (c) a non-circular, radially inwardly directed, housing seal surface on a seal member mounted at the non-circular outlet.

11. A filter element according to claim 10 wherein:
    (a) the non-circular, radially inwardly directed, housing seal surface defines a plurality of spaced radially directed lobes with non-straight seal surface sections therebetween.

12. A filter element according to claim 11 wherein:
    (a) the non-circular, radially inwardly directed, housing seal surface defines at least three spaced radially directed lobes with non-straight seal surface sections therebetween.

13. A filter element according to claim 10 wherein:
    (a) the non-circular, radially inwardly directed, housing seal surface defines a plurality of spaced radially directed lobes with seal surface sections therebetween.

14. A filter element according to claim 13 wherein:
    (a) the at least one filter panel comprises pleated media.

15. A filter element according to claim 10 wherein:
    (a) the at least one filter panel comprises at least one, generally planar, filter panel.

16. A filter element comprising:
    (a) at least one filter panel;
    (b) a support structure supporting the at least one planar filtration panel and defining a filter interior;
       (i) the support structure having a first, closed, end and a second, opposite, end with an outlet aperture therein;
       (ii) the generally planar filter panel being supported by the support structure: at a location between the first, closed end and the second, opposite, end; and, being oriented to direct air flow through the at least one, generally planar, filter panel toward a location in the filter interior between the first closed end and the second, opposite, end; and,
    (c) a seal member comprising a non-circular, radially directed, housing seal surface.

17. An air filter element according to claim 16 wherein:
    (a) the sealing surface is configured to form a radially inwardly directed sealing engagement.

18. An air filter element according to claim 16 wherein:
    (a) the filter panel comprises at least one, generally planar, panel.

19. An air filter element according to claim 18 wherein:
    (a) the filter panel comprises at least one rectangular panel.

20. An air filter element according to claim 16 wherein:
    (a) the filter panel comprises pleated media.

* * * * *